United States Patent
Navarrete Michelini et al.

(10) Patent No.: US 10,547,888 B2
(45) Date of Patent: Jan. 28, 2020

(54) METHOD AND DEVICE FOR PROCESSING ADAPTIVE MEDIA SERVICE, ENCODER AND DECODER

(71) Applicant: BOE TECHNOLOGY GROUP CO., LTD., Beijing (CN)

(72) Inventors: Pablo Navarrete Michelini, Beijing (CN); Lijie Zhang, Beijing (CN); Zhenglong Li, Beijing (CN); Jianmin He, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 246 days.

(21) Appl. No.: 15/306,212

(22) PCT Filed: Jan. 20, 2016

(86) PCT No.: PCT/CN2016/071426
§ 371 (c)(1),
(2) Date: Oct. 24, 2016

(87) PCT Pub. No.: WO2017/036070
PCT Pub. Date: Mar. 9, 2017

(65) Prior Publication Data
US 2017/0272798 A1    Sep. 21, 2017

(30) Foreign Application Priority Data
Sep. 1, 2015  (CN) .......................... 2015 1 0552867

(51) Int. Cl.
*H04N 21/2662* (2011.01)
*H04N 21/2343* (2011.01)
(Continued)

(52) U.S. Cl.
CPC ....... *H04N 21/2662* (2013.01); *H04L 65/607* (2013.01); *H04N 19/184* (2014.11);
(Continued)

(58) Field of Classification Search
CPC ............ H04N 21/2662; H04N 21/631; H04N 21/23439; H04N 21/234327;
(Continued)

(56) References Cited

U.S. PATENT DOCUMENTS 8,689,267 B2 * 4/2014 Hunt .................. H04N 21/8456
725/86
2006/0140264 A1    6/2006 Dufour et al.
(Continued)

FOREIGN PATENT DOCUMENTS

CN          1663279 A    8/2005
CN        103222277 A    7/2013
(Continued)

OTHER PUBLICATIONS

First Office Action for Chinese Application No. 201510552867.2, dated Sep. 20, 2017, 8 Pages.
(Continued)

*Primary Examiner* — Tat C Chio
(74) *Attorney, Agent, or Firm* — Brooks Kushman P.C.

(57) ABSTRACT

According to embodiments of the present disclosure, a method for processing an adaptive media service at an encoder includes a first acquisition step of acquiring a first data stream including first image encoding data obtained by encoding a first image sequence, a second acquisition step of acquiring at least one second data stream, each second data steam including second image encoding data obtained by encoding a second image sequence and a target optimization parameter corresponding to the second image encoding data, a first selection step of selecting one data stream from a first data stream set in accordance with a condition of the receiver, the first data stream set at least including the first
(Continued)

```
acquiring a first data stream including first image
encoding data obtained by encoding a first image sequence,      101
so as to enable a receiver to acquire the first image
sequence in accordance with the first image encoding data acquiring at least one second data stream, different second
data streams having different image quality and each second    102
data steam including second image encoding data obtained by
encoding a second image sequence and a target optimization
parameter corresponding to the second image encoding data selecting one data stream from a first data stream set in
accordance with a condition of the receiver, the first data    103
stream set at least including the first data stream
and the at least one second data stream transmitting the selected data stream to the receiver          104
``` data stream and the at least one second data stream, and a first transmission step of transmitting the selected data stream to the receiver.

14 Claims, 9 Drawing Sheets

(51) Int. Cl.
| | | |
|---|---|---|
| *H04N 19/184* | (2014.01) | |
| *H04N 19/44* | (2014.01) | |
| *H04L 29/06* | (2006.01) | |
| *H04N 21/4402* | (2011.01) | |

(52) U.S. Cl.
CPC ......... *H04N 19/44* (2014.11); *H04N 21/2343* (2013.01); *H04N 21/4402* (2013.01)

(58) Field of Classification Search
CPC .. H04N 19/184; H04N 19/44; H04N 21/4402; H04N 21/2343; H04N 19/30; H04L 65/4084; H04L 65/602; H04L 65/607
See application file for complete search history.

(56) References Cited

U.S. PATENT DOCUMENTS

| | | | |
|---|---|---|---|
| 2008/0052414 A1* | 2/2008 | Panigrahi | ......... H04N 21/23439 709/246 |
| 2011/0302319 A1 | 12/2011 | Ha et al. | |
| 2012/0030723 A1 | 2/2012 | Baum et al. | |
| 2012/0102184 A1 | 4/2012 | Candelore | |
| 2013/0132462 A1* | 5/2013 | Moorer | .............. H04N 21/2343 709/203 |
| 2017/0201759 A1 | 7/2017 | Navarrete Michelini et al. | |
| 2017/0272798 A1 | 9/2017 | Navarrete Michelini et al. | |

FOREIGN PATENT DOCUMENTS

| | | |
|---|---|---|
| CN | 104320669 A | 1/2015 |
| CN | 105100823 A | 11/2015 |
| CN | 105163124 A | 12/2015 |
| WO | 2010020336 A1 | 2/2010 |
| WO | 2014160553 A1 | 10/2014 |

OTHER PUBLICATIONS

International Search Report and Written Opinion for Application No. PCT/CN2016/071426, dated Apr. 29, 2016, 12 Pages.
Cisco Visual Networking Index: Global Mobile Data Traffic Forecast Update, 2016-2021 White Paper, Cisco Mobile VNI, 2017, Mar. 28, 2017, Document ID: 1454457600805266, 42 Pages.
Iain E. G. Richardson, H.264 and MPEG-4 Video Compression, Video Coding for Next-generation Multimedia, 2003, John Wiley & Sons Ltd, 11 pages.

* cited by examiner

METHOD AND DEVICE FOR PROCESSING ADAPTIVE MEDIA SERVICE, ENCODER AND DECODER

CROSS-REFERENCE TO RELATED APPLICATIONS

This application is the U.S. national phase of PCT Application No. PCT/CN2016/071426 filed on Jan. 20, 2016, which claims priority to Chinese Patent Application No. 201510552867.2 filed on Sep. 1, 2015, the disclosures of which are incorporated in their entirety by reference herein.

TECHNICAL FIELD

The present disclosure relates to the field of multimedia service, in particular to a method and a device for processing an adaptive media service, an encoder and a decoder.

BACKGROUND

An increase in multimedia services (e.g., streaming media televisions and video conference services) is an important driving factor for the innovation of broadband technology and standard. Currently, users who view digital video contents via mobile devices are increasing quickly. More and more video applications for mobile services, e.g., Yuku and Sohu, emerge so as to meet these requirements.

This trend leads to difficulties for a content service provider in transmitting media data with a limited bandwidth. Although the bandwidth is always growing stably, the requirement of data communication on the bandwidth grows more quickly. This increase in the requirement is derived from more and more services connected to the Internet and more and more user's requirements on the media content. It was shown by Cisco Visual Network Index (2015) that global mobile data communication was increased by 69% in 2014. In all the mobile data communication, the video data accounted for more than 50% in 2012. Based on the above, it becomes more and more important to increase the multimedia service capability of a mobile communication system and provide a user with high-quality services.

For the flow media, a network condition and a playback condition of the user may change frequently, so an adaptive streaming scheme has been proposed so as to solve the above problem to some extent. A multi-stream video encoder server may encode one video image into streams with different code rates and output the streams. For example, a full-high-definition (FHD) video image (with a resolution of 1920*1080) may be encoded into, and outputted as, a HD stream (with a resolution of 1280*720) and a D1 stream (with a resolution of 720*576) with different resolutions (code rates). A client device may request the video encoder server for a suitable stream in accordance with its network condition, so as to improve the user experience, both for a high-end user and a low-end user.

Such schemes as smooth streaming (Microsoft Corporation), Hyper Text Transport Protocol (HTTP) adaptive streaming (Apple Inc.) and dynamic flash streaming (Adobe Systems Inc.) have achieved great success in market.

Currently, for an adaptive bit rate scheme, it is necessary for a display device at a user side to adjust an input stream, so as to be adapted to the resolution and display an image at the full resolution. A typical amplification algorithm (e.g., a Bicubic algorithm or a Lanczos algorithm (which is used to convert a symmetric matrix into a symmetric tridiagonal matrix through orthogonal similarity transformation, in the name of a twentieth-century Hungarian mathematician Cornelius Lanczos) may introduce a visual error (e.g., sawtooth or annular artifacts). More importantly, the processing is performed by the conventional amplification algorithm based on the received stream, without taking the original multimedia image data into consideration.

Hence, the conventional method for processing the adaptive media service may provide bad user experience.

SUMMARY (1) Technical Problem to be Solved

An object of the present disclosure is to provide a method and a device for processing an adaptive media service, an encoder and a decoder, so as to improve the user experience.

(2) Technical Solution

The present disclosure provides in some embodiments a method for processing an adaptive media service at an encoder, including: a first acquisition step of acquiring a first data stream including first image encoding data obtained by encoding a first image sequence, so as to enable a receiver to acquire the first image sequence in accordance with the first image encoding data; a second acquisition step of acquiring at least one second data stream, different second data streams having different image quality and each second data steam including second image encoding data obtained by encoding a second image sequence and a target optimization parameter corresponding to the second image encoding data, so as to enable the receiver to decode the second image encoding data to obtain the second image sequence, and perform quality improvement on the second image sequence in accordance with the target optimization parameter to obtain a third image sequence, the target optimization parameter being obtained in accordance with the first image sequence and the second image sequence, an identical content being recorded in the first image sequence, the second image sequence and the third image sequence, image quality of each second image sequence being lower than those of the first image sequence and the third image sequence; a first selection step of selecting one data stream from a first data stream set in accordance with a condition of the receiver, the first data stream set at least including the first data stream and the at least one second data stream; and a first transmission step of transmitting the selected data stream to the receiver.

In one possible embodiment, the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the available optimization parameter in_param.

In one possible embodiment, the second acquisition step includes: a quality reduction step of performing quality reduction on the first image sequence so as to obtain the at least one second image sequence; an encoding step of encoding each of second image sequences so as to obtain the second image encoding data corresponding to each of the second image sequences in a one-to-one manner; a first parameter determination step of calculating the target optimization parameter corresponding to each of the second image sequences in a one-to-one manner; and a combination step of combining the second image encoding data and the corresponding target optimization parameter so as to obtain the at least one second data stream.

In one possible embodiment, the second acquisition step includes: a quality reduction step of performing quality reduction on the first image sequence so as to obtain the at least one second image sequence; an encoding step of encoding each of second image sequences so as to obtain the second image encoding data corresponding to each of the second image sequences in a one-to-one manner; a second parameter determination step of determining an image type of the first image sequence and a quality-reduction level corresponding to each of the second image sequences in a one-to-one manner; a third parameter determination step of determining the target optimization parameter corresponding to each of the second image sequences in accordance with a pre-stored correspondence among the quality-reduction level, the image type and the target optimization parameter; and a combining step of combining each of the second image encoding data and the corresponding target optimization parameter so as to obtain the at least one second data stream.

In one possible embodiment, the second acquisition step includes: a quality reduction step of performing quality reduction on the first image sequence so as to obtain the at least one second image sequence; an encoding step of encoding each of second image sequences so as to obtain the second image encoding data corresponding to each of the second image sequences in a one-to-one manner; a first determination step of determining a service type of the adaptive media service; a fourth parameter determination step of, in the case that the service type of the adaptive media service is a real-time service, acquiring the target optimization parameter corresponding to each of the second image sequences in accordance with a pre-stored correspondence among a quality-reduction level, an image type and the target optimization parameter, and otherwise, calculating the target optimization parameter corresponding to each of the second image sequences; and a combining step of combining each of the second image encoding data and the corresponding target optimization parameter, so as to obtain the at least one second data stream.

In one possible embodiment, the method further includes a compression step of compressing the target optimization parameter corresponding to each of the second image sequences, and the combining step includes combining the second image encoding data and the corresponding compressed target optimization parameter.

In one possible embodiment, the second data stream includes a meta data section and an attachment support section, and the target optimization parameter is stored in the meta data section or the attachment support section.

In one possible embodiment, the method further includes: a third acquisition step of acquiring at least one third data stream corresponding to the at least one second data stream, each third data stream including the corresponding second image encoding data rather than the target optimization parameter; and a first switching step of, in the case that a data volume of the target optimization parameter is greater than a predetermined threshold, entering the first selection step and otherwise entering the second selection step. The second selection step includes selecting one data stream from a second data stream set, and the second data stream set consists of the first data stream and the at least one second data stream. The first data stream set consists of the first data stream, the at least one second data stream and the at least one third data stream.

In one possible embodiment, the method further includes a third acquisition step of acquiring at least one third data stream corresponding to the at least one second data stream, each third data stream including the corresponding second image encoding data rather than the target optimization parameter. The first data stream set further includes the at least one third data stream.

In one possible embodiment, the method further includes: a third acquisition step of acquiring at least one third data stream corresponding to the at least one second data stream, each third data stream including the corresponding second image encoding data rather than the target optimization parameter; and a second switching step of, in the case that the receiver is capable of parsing the target optimization parameter and performing the quality improvement in accordance with the target optimization parameter, entering the first selection step, and otherwise entering a third selection step of selecting one data stream from a third data stream set consisting of the first data stream and the at least one third data stream. The first data stream set consists of the first data stream and the at least one second data stream.

In one possible embodiment, the method further includes: a second determination step of determining, prior to acquiring the at least one second data stream, whether or not the target optimization parameter needs to be updated, so as to acquire a determination result, entering the second acquisition step in the case that the determination result indicates that the target optimization parameter needs to be updated, and otherwise entering a replacement step. The replacement step includes acquiring at least one third data stream corresponding to the at least one second data stream, selecting one data stream from a third data stream set, and entering the first transmission step. Each third data stream includes the corresponding second image encoding data rather than the target optimization parameter. The third data stream set consists of the first data stream and the at least one third data stream.

In another aspect, the present disclosure provides in some embodiments a method for processing an adaptive media service at a decoder, including: a reception step of receiving a second data stream selected by a transmitter in accordance with a condition of a receiver, the second data stream including a first section for transmitting second image encoding data and a second section for transmitting a target optimization parameter; a parsing step of parsing the second data stream so as to acquire the second image encoding data carried in the first section and the target optimization parameter carried in the second section; a decoding step of decoding the second image encoding data so as to obtain a second image sequence, image quality of which is lower than that of an original first image sequence; and a quality improvement step of performing quality improvement on the second image sequence in accordance with the target optimization parameter, so as to obtain a third image sequence, image quality of which is higher than that of the second image sequence.

In one possible embodiment, the method further includes a second transmission step of transmitting the condition of the receiver to the transmitter.

In one possible embodiment, the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the available optimization parameter in_param.

In one possible embodiment, the method further includes a third transmission step of transmitting to the transmitter a message indicating that the receiver is capable of parsing the target optimization parameter and performing the quality improvement in accordance with the target optimization parameter, so as to enable the transmitter to generate the second data stream and perform adaptive selection from a set including the second data stream.

In one possible embodiment, the method further includes: a storage step of storing the parsed target optimization parameter; and an extraction step of extracting, prior to receiving a new target optimization parameter, the stored target optimization parameter for the quality improvement step.

In one possible embodiment, the target optimization parameter carried in the second section is a compressed target optimization parameter, and the target optimization parameter is acquired in the parsing step through decompression.

In yet another aspect, the present disclosure provides in some embodiments a device for processing an adaptive media service at an encoder, including: a first acquisition module configured to acquire a first data stream including first image encoding data obtained by encoding a first image sequence, so as to enable a receiver to acquire the first image sequence in accordance with the first image encoding data; a second acquisition module configured to acquire at least one second data stream, different second data streams having different image quality and each second data steam including second image encoding data obtained by encoding a second image sequence and a target optimization parameter corresponding to the second image encoding data, so as to enable the receiver to decode the second image encoding data to obtain the second image sequence, and perform quality improvement on the second image sequence in accordance with the target optimization parameter to obtain a third image sequence, the target optimization parameter being obtained in accordance with the first image sequence and the second image sequence, an identical content being recorded in the first image sequence, the second image sequence and the third image sequence, image quality of each second image sequence being lower than those of the first image sequence and the third image sequence; a first selection module configured to select one data stream from a first data stream set in accordance with a condition of the receiver, the first data stream set at least including the first data stream and the at least one second data stream; and a first transmission module configured to transmit the selected data stream to the receiver.

In one possible embodiment, the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the available optimization parameter in_param.

In one possible embodiment, the second acquisition module includes: a quality reduction module configured to perform quality reduction on the first image sequence so as to obtain the at least one second image sequence; an encoding module configured to encode each of second image sequences so as to obtain the second image encoding data corresponding to each of the second image sequences in a one-to-one manner; a first parameter determination module configured to calculate the target optimization parameter corresponding to each of the second image sequences in a one-to-one manner; and a combination module configured to combine the second image encoding data and the corresponding target optimization parameter so as to obtain the at least one second data stream.

In one possible embodiment, the second acquisition module includes: a quality reduction module configured to perform quality reduction on the first image sequence so as to obtain the at least one second image sequence; an encoding module configured to encode each of second image sequences so as to obtain the second image encoding data corresponding to each of the second image sequences in a one-to-one manner; a second parameter determination module configured to determine an image type of the first image sequence and a quality-reduction level corresponding to each of the second image sequences in a one-to-one manner; a third parameter determination module configured to determine the target optimization parameter corresponding to each of the second image sequences in accordance with a pre-stored correspondence among the quality-reduction level, the image type and the target optimization parameter; and a combination module configured to combine each of the second image encoding data and the corresponding target optimization parameter so as to obtain the at least one second data stream.

In one possible embodiment, the second acquisition module includes: a quality reduction module configured to perform quality reduction on the first image sequence so as to obtain the at least one second image sequence; an encoding module configured to encode each of second image sequences so as to obtain the second image encoding data corresponding to each of the second image sequences in a one-to-one manner; a first determination module configured to determine a service type of the adaptive media service; a fourth parameter determination module configured to, in the case that the service type of the adaptive media service is a real-time service, acquire the target optimization parameter corresponding to each of the second image sequences in accordance with a pre-stored correspondence among a quality-reduction level, an image type and the target optimization parameter, and otherwise, calculate the target optimization parameter corresponding to each of the second image sequences; and a combination module configured to combine each of the second image encoding data and the corresponding target optimization parameter, so as to obtain the at least one second data stream.

In one possible embodiment, the device further includes a compression module configured to compress the target optimization parameter corresponding to each of the second image sequences, and the combination module is further configured to combine the second image encoding data and the corresponding compressed target optimization parameter.

In one possible embodiment, the second data stream includes a meta data section and an attachment support section, and the target optimization parameter is stored in the meta data section or the attachment support section.

In one possible embodiment, the device further includes: a third acquisition module configured to acquire at least one third data stream corresponding to the at least one second data stream, each third data stream including the corresponding second image encoding data rather than the target optimization parameter; and a first switching module configured to, in the case that a data volume of the target optimization parameter is greater than a predetermined threshold, trigger the first selection module and otherwise trigger the second selection module. The second selection module is further configured to select one data stream from a second data stream set, and the second data stream set consists of the first data stream and the at least one second data stream. The first data stream set consists of the first data stream, the at least one second data stream and the at least one third data stream.

In one possible embodiment, the device further includes a third acquisition module configured to acquire at least one third data stream corresponding to the at least one second data stream, each third data stream including the corresponding second image encoding data rather than the target optimization parameter. The first data stream set further includes the at least one third data stream.

In one possible embodiment, the device further includes: a third acquisition module configured to acquire at least one third data stream corresponding to the at least one second data stream, each third data stream including the corresponding second image encoding data rather than the target optimization parameter; and a second switching module configured to, in the case that the receiver is capable of parsing the target optimization parameter and performing the quality improvement in accordance with the target optimization parameter, trigger the first selection module, and otherwise trigger a third selection module which is configured to select one data stream from a third data stream set consisting of the first data stream and the at least one third data stream. The first data stream set consists of the first data stream and the at least one second data stream.

In still yet another aspect, the present disclosure provides in some embodiments a device for processing an adaptive media service at a decoder, including: a reception module configured to receive a second data stream selected by a transmitter in accordance with a condition of a receiver, the second data stream including a first section for transmitting second image encoding data and a second section for transmitting a target optimization parameter; a parsing module configured to parse the second data stream so as to acquire the second image encoding data carried in the first section and the target optimization parameter carried in the second section; a decoding module configured to decode the second image encoding data so as to obtain a second image sequence, image quality of which is lower than that of an original first image sequence; and a quality improvement module configured to perform quality improvement on the second image sequence in accordance with the target optimization parameter, so as to obtain a third image sequence, image quality of which is higher than that of the second image sequence.

In one possible embodiment, the device further includes a second transmission module configured to transmit the condition of the receiver to the transmitter.

In one possible embodiment, the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the available optimization parameter in_param.

In one possible embodiment, the device further includes a third transmission module configured to transmit to the transmitter a message indicating that the receiver is capable of parsing the target optimization parameter and performing the quality improvement in accordance with the target optimization parameter, so as to enable the transmitter to generate the second data stream and perform adaptive selection from a set including the second data stream.

In one possible embodiment, the device further includes: a storage module configured to store the parsed target optimization parameter; and an extraction module configured to extract, prior to receiving a new target optimization parameter, the stored target optimization parameter for the quality improvement module.

In one possible embodiment, the target optimization parameter carried in the second section is a compressed target optimization parameter, and the target optimization parameter is acquired by the parsing module through decompression.

In still yet another aspect, the present disclosure provides in some embodiments an encoder including the above-mentioned device for processing an adaptive media service at an encoder.

In still yet another aspect, the present disclosure provides in some embodiments a decoder including the above-mentioned device for processing an adaptive media service at a decoder.

(3) Beneficial Effects

At least one of the following beneficial effects may be acquired.

Firstly, according to the embodiments of the present disclosure, the target optimization parameter obtained in accordance with an original image sequence and an image sequence carried in a current stream may be added into the stream, so that the quality improvement may be performed on an image sequence decoded from the stream at the decoder in accordance with the target optimization parameter, so as to acquire an image sequence having higher image quality. Because the original image sequence is taken into consideration in the target optimization parameter, as compared with the image sequence obtained merely through optimizing the image sequence decoded from the stream, it is able to provide higher image quality and thereby improve the user experience.

Secondly, according to the embodiments of the present disclosure, the image sequence decoded from the stream may be optimized based on the similarity to the original image sequence, and the target optimization parameter may be selected so as to obtain the image sequence having the highest similarity to the original image sequence. As a result, it is able to further improve the user experience.

Thirdly, according to the embodiments of the present disclosure, the target optimization parameter may be carried in the meta data section or the attachment support section, so a client device that does not support the methods in the embodiments of the present disclosure may neglect the target optimization parameter and perform the processing using the conventional method. As a result, it is able to achieve forward compatibility.

Fourthly, according to the embodiments of the present disclosure, the target optimization parameter may be compressed and combined into the stream for the subsequent transmission, so it is able to reduce the requirement on a network bandwidth.

Fifthly, according to the embodiments of the present disclosure, different streams may be generated depending on whether or not the client device supports the methods in the embodiments of the present disclosure. As a result, it is able to not only reduce the burden at a server, but also improve a switching efficiency and a switching speed.

Sixthly, according to the embodiments of the present disclosure, the quality improvement may be performed in accordance with the previously-received target optimization parameter in the case that an application scenario is not changed. As a result, it is able to reduce the data volume transmitted between a server and the client.

BRIEF DESCRIPTION OF THE DRAWINGS

In order to illustrate the technical solutions in the embodiments of the present disclosure or the related art in a clearer manner, the drawings desired for the present disclosure or the related art will be described briefly hereinafter. Obviously, the following drawings merely relate to parts of the embodiments of the present disclosure, and a person skilled in the art may, without any creative effort, acquire the other drawings based on these drawings.

DETAILED DESCRIPTION

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

According to the embodiments of the present disclosure, a target optimization parameter obtained in accordance with an original image sequence and an image sequence carried in a current stream may be added into the stream, so that the quality improvement may be performed on an image sequence decoded from the stream at a decoder in accordance with the target optimization parameter, so as to acquire an image sequence having higher image quality. Because the original image sequence is taken into consideration in the target optimization parameter, as compared with the image sequence obtained merely through optimizing the image sequence decoded from the stream, it is able to provide higher image quality and thereby improve the user experience.

Figure 1:
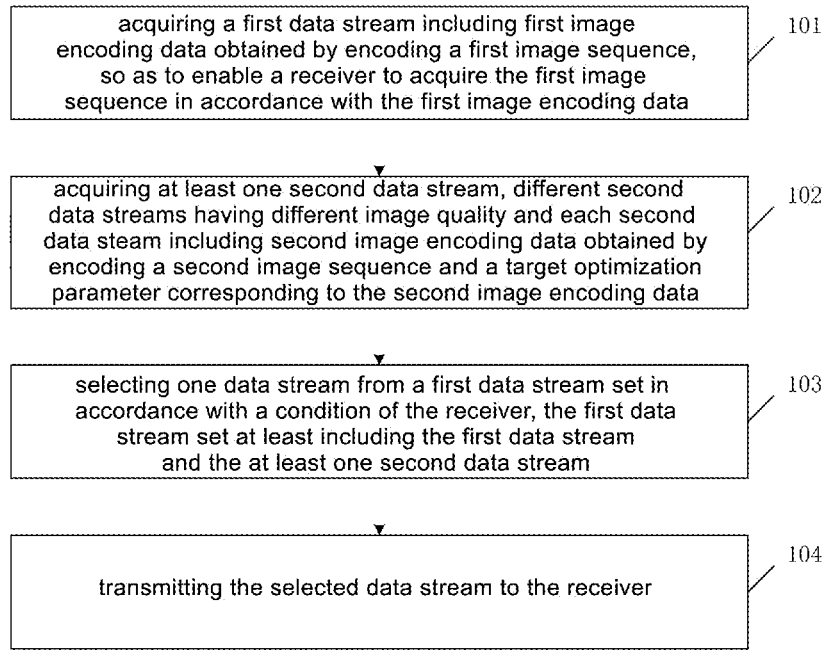
FIG. 1 is a flow chart of a method for processing an adaptive media service at an encoder according to one embodiment of the present disclosure.
Figure 2:
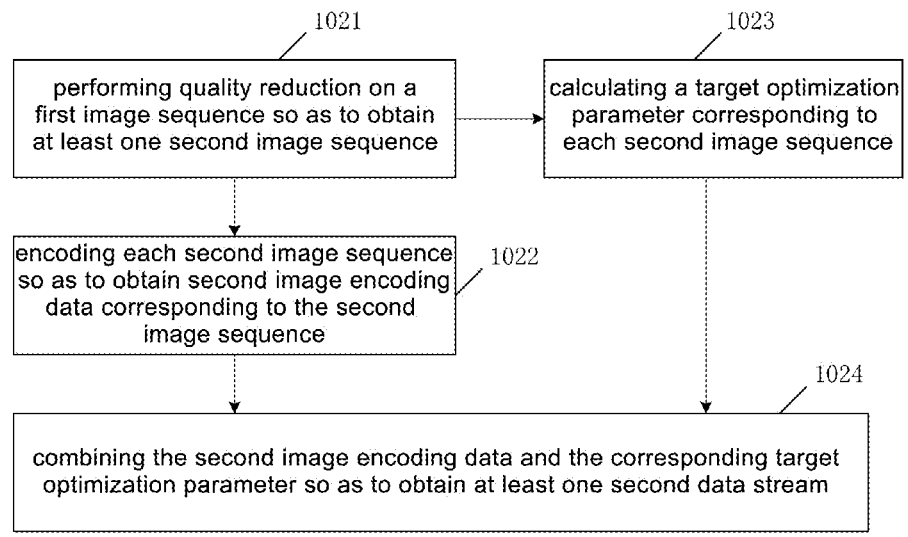
FIG. 2 is a flow chart of a second acquisition step according to one embodiment of the present disclosure.

As shown in FIG. 1, the present disclosure provides in some embodiments a method for processing an adaptive media service, which includes: a first acquisition step 101 of acquiring a first data stream including first image encoding data obtained by encoding a first image sequence, so as to enable a receiver to acquire the first image sequence in accordance with the first image encoding data; a second acquisition step 102 of acquiring at least one second data stream, different second data streams having different image quality and each second data steam including second image encoding data obtained by encoding a second image sequence and a target optimization parameter corresponding to the second image encoding data, so as to enable the receiver to decode the second image encoding data to obtain the second image sequence, and perform quality improvement on the second image sequence in accordance with the target optimization parameter to obtain a third image sequence, the target optimization parameter being obtained in accordance with the first image sequence and the second image sequence, an identical content being recorded in the first image sequence, the second image sequence and the third image sequence, image quality of each second image sequence being lower than those of the first image sequence and the third image sequence; a first selection step 103 of selecting one data stream from a first data stream set in accordance with a condition of the receiver, the first data stream set at least including the first data stream and the at least one second data stream; and a first transmission step 104 of transmitting the selected data stream to the receiver.

According to the embodiments of the present disclosure, the target optimization parameter obtained in accordance with an original image sequence and an image sequence carried in a current stream may be added into the stream, so that the quality improvement may be performed on an image sequence decoded from the stream at the decoder in accordance with the target optimization parameter, so as to acquire an image sequence having higher image quality. Because the original image sequence is taken into consideration in the target optimization parameter, as compared with the image sequence obtained merely through optimizing the image sequence decoded from the stream, it is able to provide higher image quality and thereby improve the user experience.

In the embodiments of the present disclosure, the various optimization modes may be used, and one possible optimization mode will be described hereinafter.

In an alternative embodiment of the present disclosure, the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the available optimization parameter in_param.

In other words, the target optimization parameter may be determined in accordance with such a condition that a first similarity is greater than any second similarity. Of course, the target optimization parameter may also be determined in accordance with any other condition similar to the similarity, which will not be particularly defined herein.

The first similarity is that between the third image sequence and the first image sequence, and the second similarity is that between an image sequence obtained through quality improvement on the second image sequence in accordance with the other optimization parameter in the available optimization parameters different from the target optimization parameter and the first image sequence.

The target optimization parameter will be described hereinafter mathematically.

In the embodiments of the present disclosure, for a $k^{th}$ stream, the target optimization parameter out_param may be represented as follows: out_param≈ArgMax$_{param}$Similarity (MLM(LR[k],in_param[k]),HR[k]), where ArgMaxx(f(x)) represents a variable x corresponding to a maximum value of f(x), LR[k] represents an image sequence carried in the $k^{th}$ stream, i.e., the corresponding second image sequence in the $k^{th}$ stream, In_param[k] represents available optimization parameters corresponding to the $k^{th}$ stream and there are at least two available optimization parameters, HR[k] represents an input image sequence corresponding to the $k^{th}$ stream, i.e., the original first image sequence to be transmitted, and MLM(LR[k],in_param[k]) represents the image sequence obtained through the quality improvement on LR[k] in accordance with the available optimization parameter In_param[k].

For example, an algorithm set may include algorithms Z1, Z2, Z3, . . . , and Zn (i.e., the optimization parameters are the algorithms used for performing the quality improvement on the image). For an image sequence Y carried in a to-be-transmitted stream (the image sequence Y is obtained through quality reduction on an original image sequence X), the quality improvement may be performed (in real time or in advance, which will be described hereinafter) on its image sequence Y in accordance with Z1, Z2, Z3, . . . , and Zn, so as to obtain image sequences Y1, Y2, Y3, . . . , and Yn.

At this time, similarities between Y1, Y2, Y3, . . . , Yn and X may be calculated respectively, so as to determine an image sequence Ym (m=1, 2, . . . , n) with the highest similarity.

At this time, an algorithm corresponding to the image sequence Ym is an optimum algorithm, and the target optimization parameter may be determined as the algorithm corresponding to the image sequence Ym. At a decoder, the corresponding quality improvement is performed on the image sequence carried in the kth stream using the algorithm represented by the target optimization parameter.

In the embodiments of the present disclosure, these algorithms may be linear interpolation algorithms, bicubic interpolation algorithms or cellular neural network (CNN) algorithms, which will not be particularly defined herein.

For the CNN algorithm, a parameter for 3 CNN layers needs to be provided, so as to enable a CNN to perform the quality improvement on the image.

The training of the CNN and the determination of the parameter are beyond the scope of the present disclosure, and thus will not be particularly defined herein.

The adaptive media service may include two types of services, i.e., an off-line service and a real-time service (e.g., a video conference). Among them, the real-time performance for the transmission of the image sequence is highly demanded by the real-time service. Hence, in the embodiments of the present disclosure, with respect to the two types of services with different real-time requirements, the corresponding target optimization parameters may be acquired in different modes. Of course, in the case of lower real-time requirement, the corresponding target optimization parameter may be acquired in an identical mode, which will not be particularly defined herein.

It is found that, in the embodiments of the present disclosure, a series of operations, including an operation for the quality improvement and an operation for the similarity of the image sequence, need to be performed so as to determine the target optimization parameters corresponding to different streams. As is known to all, it may take a certain period of time for any operation, and especially in the case of an inferior processor, it may take more time to perform the operations.

For the off-line service, its data content (e.g., a movie) already exists, so an encoding operation may be performed prior to a request from a user. At this time, the data content may also be played by the client before the entire file has been completely downloaded. Hence, for the off-line service with lower real-time requirement, the target optimization parameter may be calculated in real time during the transmission.

In this regard, the second acquisition step 102 may include: a quality reduction step 1021 of performing quality reduction on the first image sequence so as to obtain the at least one second image sequence; an encoding step 1022 of encoding each of second image sequences so as to obtain the second image encoding data corresponding to each of the second image sequences in a one-to-one manner; a first parameter determination step 1023 of calculating the target optimization parameter corresponding to each of the second image sequences in a one-to-one manner; and a combination step 1024 of combining the second image encoding data and the corresponding target optimization parameter so as to obtain the at least one second data stream.

As mentioned above, the second acquisition step includes the first parameter determination step, so it is necessary to calculate in real time the target optimization parameter corresponding to each of the second image sequences, i.e., perform the quality improvement on the second image sequences in accordance with each algorithm in the algorithm set, then calculate the similarity between each of image sequences obtained after the quality improvement and the first image sequence, and then select the corresponding target optimization parameter in accordance with the similarity.

It is found that, although with a large computational burden, it is able to acquire the target optimization parameter in a more accurate manner.

For the real-time service with high real-time requirement, the above-mentioned mode for acquiring the target optimization parameter may be not particularly suitable. In this regard, the present disclosure provides in some embodiments another mode for acquiring the target optimization parameter through calculating the target optimization parameter in advance and then looking up a table, so as to meet the real-time requirement.

Figure 3:
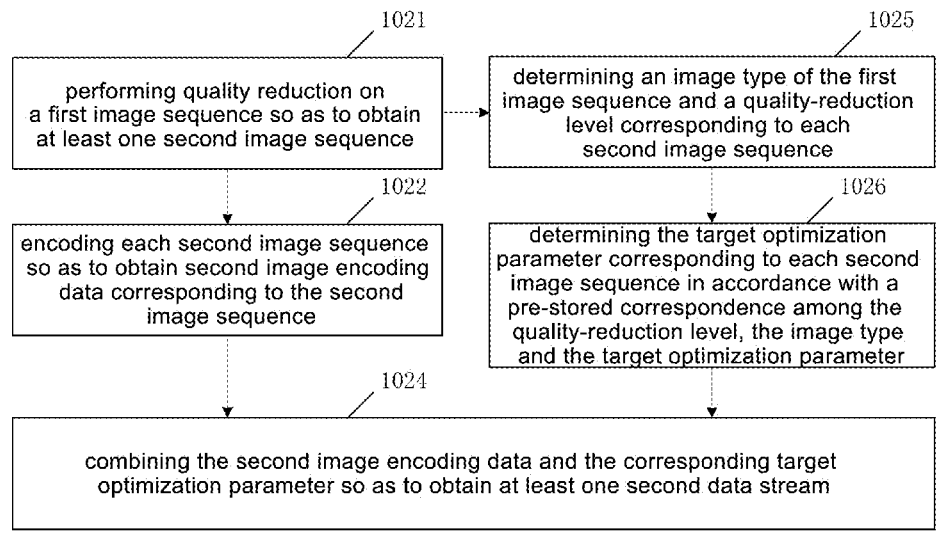
FIG. 3 is another flow chart of the second acquisition step according to one embodiment of the present disclosure.

As shown in FIG. 3, the second acquisition step 102 includes: a quality reduction step 1021 of performing quality reduction on the first image sequence so as to obtain the at least one second image sequence; an encoding step 1022 of encoding each of second image sequences so as to obtain the second image encoding data corresponding to each of the second image sequences in a one-to-one manner; a second parameter determination step 1025 of determining an image type of the first image sequence and a quality-reduction level corresponding to each of the second image sequences in a one-to-one manner; a third parameter determination step 1026 of determining the target optimization parameter corresponding to each of the second image sequences in accordance with a pre-stored correspondence among the quality-reduction level, the image type and the target optimization parameter; and a combining step 1024 of combining each of the second image encoding data and the corresponding target optimization parameter so as to obtain the at least one second data stream.

It should be appreciated that, the serial numbers of the above steps are not used to represent any order of the steps.

It is found that, in the above mode for acquiring the target optimization parameter, prior to acquiring the second data stream, it is merely required to determine the image type of the first image sequence and the quality-reduction level corresponding to each of the second image sequences, and then determine the target optimization parameter in accordance with the correspondence among the pre-stored quality-reduction level, the image type and the target optimization parameter, so as to remarkably reduce the computational burden as compared with the mode where the quality improvement and the calculation of the similarity between the image sequences need to be performed. As a result, it is able to improve a processing speed and meet the real-time requirement of the real-time service.

For example, there are N1 image types (e.g., cartoon or natural landscape), and the original image sequence has N2 resolutions. In addition, with respect to each resolution of the original image sequence, the second image sequence has N3 resolutions (which are all lower than the resolution of the original image sequence), i.e., N3 is less than N2.

Here, the quality-reduction level refers to the conversion between the resolution of the original image sequence and the resolution of the second image sequence.

In the case that the original image sequence has a resolution of 1920*1080 and the second image sequence has resolutions of 1280*720 and 720*576, there may be two quality-reduction levels, i.e., a level from 1920*1080 to 1280*720, and a level from 1920*1080 to 720*576.

In this case, in the above-mentioned second mode for acquiring the target optimization parameter, it is required to calculate in advance the corresponding target optimization parameters with respect to N1*N2*N3 combinations, so as to obtain the correspondence among the quality-reduction levels, the image types and the target optimization parameters.

The acquired correspondence may be stored in a database. After acquiring the image type of the first image sequence and the quality-reduction level corresponding to the second image sequence, it is able to determine the target optimization parameter in accordance with the correspondence.

Figure 4:
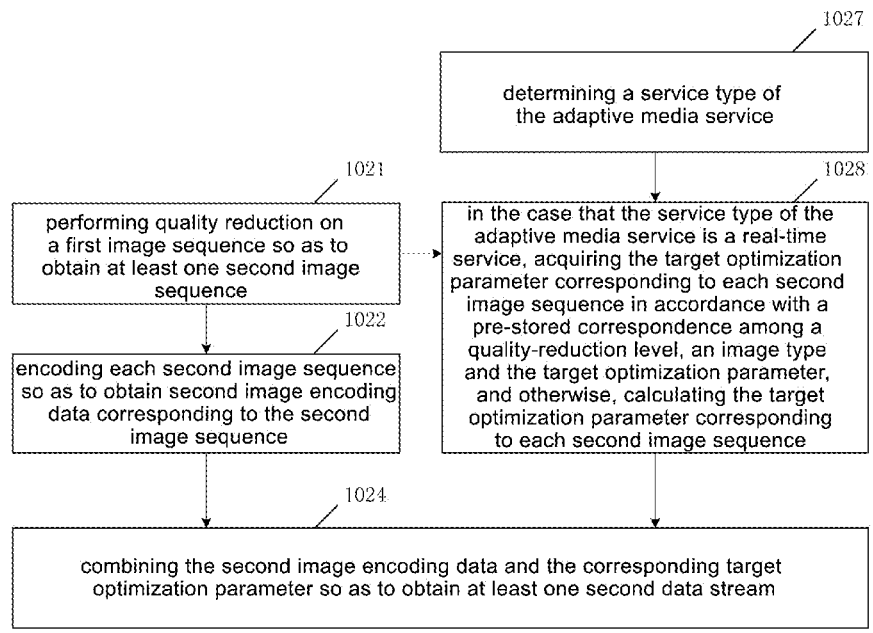
FIG. 4 is yet another flow chart of the second acquisition step according to one embodiment of the present disclosure.

The above-mentioned two modes for acquiring the target optimization parameter may be used independently, or in combination so as to be adapted to various service types. In other words, as shown in FIG. 4, the second acquisition step may include: a quality reduction step 1021 of performing quality reduction on the first image sequence so as to obtain the at least one second image sequence; an encoding step 1022 of encoding each of second image sequences so as to obtain the second image encoding data corresponding to each of the second image sequences in a one-to-one manner; a determination step 1027 of determining a service type of the adaptive media service; a fourth parameter determination step 1028 of, in the case that the service type of the adaptive media service is a real-time service, acquiring the target optimization parameter corresponding to each of the second image sequences in accordance with a pre-stored correspondence among a quality-reduction level, an image type and the target optimization parameter, and otherwise, calculating the target optimization parameter corresponding to each of the second image sequences; and a combining step 1024 of combining each of the second image encoding data and the corresponding target optimization parameter, so as to obtain the at least one second data stream.

In this mode, the target optimization parameter may be acquired adaptively at the encoder in accordance with the service type. In the case that the service type is an off-line service, the target optimization parameter may be acquired through calculation in real time, so as to improve the quality of the image sequence outputted at the encoder. In the case that the service type is a real-time service, the target optimization parameter may be acquired directly in accordance with the pre-stored correspondence, so as to meet the real-time requirement.

As compared with the related art, in the embodiments of the present disclosure, additional data (the target optimization parameter) needs to be transmitted. Hence, the target optimization parameter may be compressed, so as to reduce the data transmission volume.

In other words, the method may further include a compression step of compressing the target optimization parameter corresponding to each of the second image sequences, and the combining step includes combining the second image encoding data and the corresponding compressed target optimization parameter.

In the embodiments of the present disclosure, the additional data (the target optimization parameter) may be transmitted in various ways, e.g., adding a field in the data stream or using a reserved field. However, it is impossible for these ways to achieve forward compatibility.

In the embodiments of the present disclosure, in order to achieve the forward compatibility, the target optimization parameter may be carried in a meta data section or an attachment support section having the forward compatibility. In this way, a client that does not support the method in the embodiments of the present disclosure may neglect the target optimization parameter and perform the processing through the conventional method.

In other words, in the embodiments of the present disclosure, the second data stream including the meta data section and the attachment support section, and the target optimization parameter is stored in the meta data section or the attachment support section.

No influence may be caused to the receiver in the case that the target optimization parameter is transmitted via the meta data section or the attachment support section. Hence, in the case that the target optimization parameter is of a small data volume, no great influence may be caused even in the case that the target optimization parameter is carried in the data stream. At this time, the target optimization parameters may be directly carried in all the data streams, so as to reduce the number of the streams, and improve the efficiency at the encoder and the switching efficiency between the streams.

In the case that the target optimization parameter is of a great data volume, a great influence may be caused in the case that the target optimization parameter is carried in the data stream. At this time, the switching efficiency is no longer the most important consideration, and it is required to provide each stream with the data stream carrying the target optimization parameter and the data stream not carrying the target optimization parameter.

As mentioned above, in the above-mentioned way, both the switching efficiency and the transmission efficiency are taken into consideration.

Figure 5:
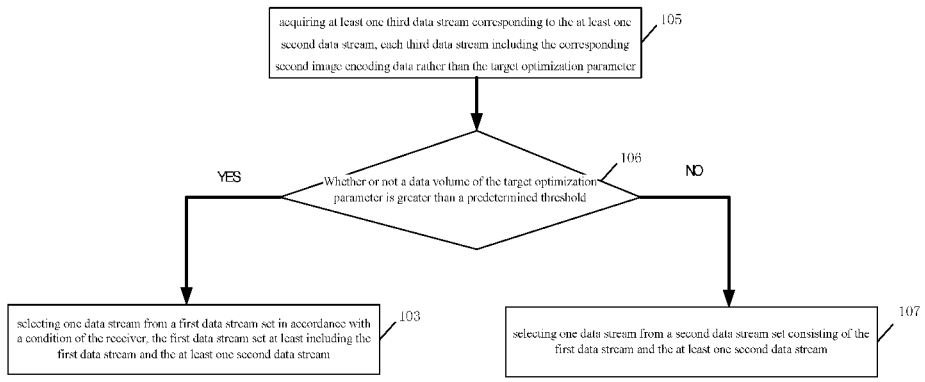
FIG. 5 is another flow chart of the method for processing an adaptive media service at an encoder according to one embodiment of the present disclosure.

In other words, as shown in FIG. 5, the method may further include: a third acquisition step 105 of acquiring at least one third data stream corresponding to the at least one second data stream, each third data stream including the corresponding second image encoding data rather than the target optimization parameter; and a first switching step 106 of, in the case that a data volume of the target optimization parameter is greater than a predetermined threshold, entering the first selection step 103 and otherwise entering the second selection step 107. The second selection step 107 includes selecting one data stream from a second data stream set, and the second data stream set consists of the first data stream and the at least one second data stream. The first data stream set consists of the first data stream, the at least one second data stream and the at least one third data stream.

Of course, the stream carrying the target optimization parameter may certainly have a data volume different from the conventional stream not carrying the target optimization parameter, and thereby the selection of the stream may be adversely affected. Hence, in the embodiments of the present disclosure, in another way, a new stream carrying the target optimization parameter and the conventional stream not carrying the target optimization parameter may be generated with respect to each image sequence, so as to improve the flexibility of the adaptive selection.

In other words, the method may further include a third acquisition step of acquiring at least one third data stream corresponding to the at least one second data stream, each third data stream including the corresponding second image encoding data rather than the target optimization parameter. The first data stream set further includes the at least one third data stream.

As mentioned above, the target optimization parameter may be transmitted in various ways, but in the case that an opposite end (the receiver) does not support the quality improvement in accordance with the target optimization parameter, additional invalid data may occur even if no influence is caused by the target optimization parameter to the receiver.

Hence, in the embodiments of the present disclosure, whether or not the target optimization parameter is to be transmitted may depend on whether or not the receiver supports the target optimization parameter, so as to improve the utilization rate of the bandwidth.

Figure 6:
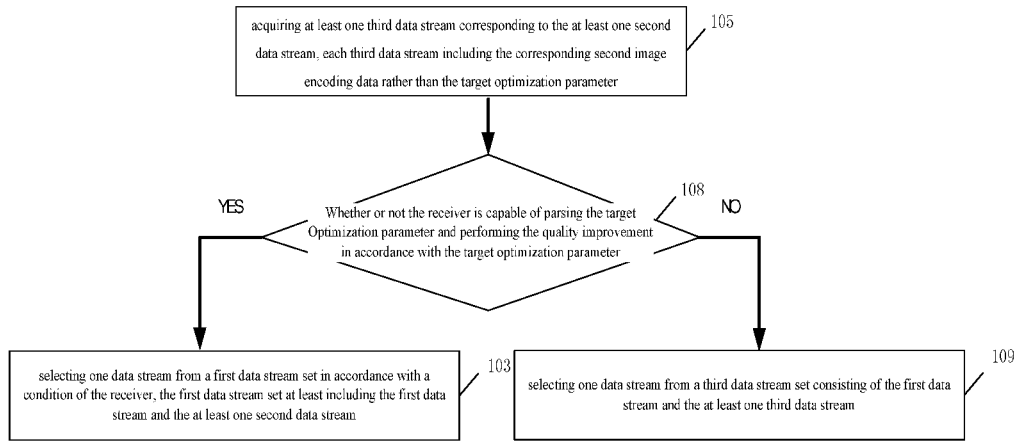
FIG. 6 is yet another flow chart of the method for processing an adaptive media service at an encoder according to one embodiment of the present disclosure.

In other words, as shown in FIG. 6, the method may further include: a third acquisition step 105 of acquiring at least one third data stream corresponding to the at least one second data stream, each third data stream including the corresponding second image encoding data rather than the target optimization parameter; and a second switching step 108 of, in the case that the receiver is capable of parsing the target optimization parameter and performing the quality improvement in accordance with the target optimization parameter, entering the first selection step 103, and otherwise entering a third selection step 109 of selecting one data stream from a third data stream set consisting of the first data stream and the at least one third data stream. The first data stream set consists of the first data stream and the at least one second data stream.

In the embodiments of the present disclosure, a network condition and any other playing condition of the receiver may be changed gradually, and the streams shall not be switched frequently. Hence, the target optimization parameter may also be transmitted periodically or merely in the case that it has been changed, so as to reduce the data transmission volume. At this time, it is required to store a historical target optimization parameter at the receiver, and update it in real time. In the case of no new target optimization parameter, the stored historical target optimization parameter may be used for the subsequent quality improvement.

Figure 7:
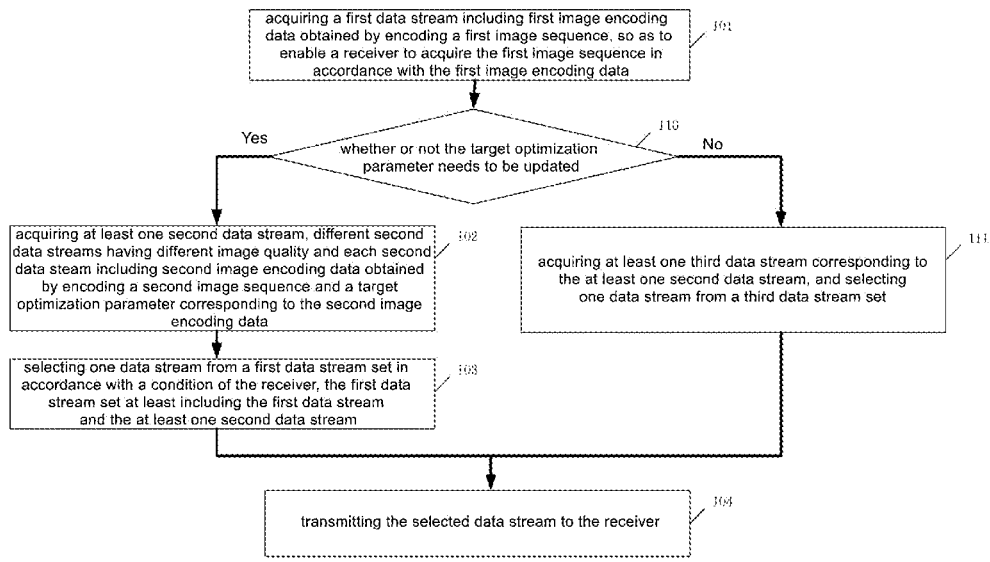
FIG. 7 is still yet another flow chart of the method for processing an adaptive media service at an encoder according to one embodiment of the present disclosure.

At this time, as shown in FIG. 7, the method may further include a second determination step 110 of determining, prior to acquiring the at least one second data stream, whether or not the target optimization parameter needs to be updated, so as to acquire a determination result, entering the second acquisition step 102 in the case that the determination result indicates that the target optimization parameter needs to be updated, and otherwise entering a replacement step 111. The replacement step 111 includes acquiring at least one third data stream corresponding to the at least one second data stream, selecting one data stream from a third data stream set, and entering the first transmission step. Each third data stream includes the corresponding second image encoding data rather than the target optimization parameter. The third data stream set consists of the first data stream and the at least one third data stream.

In this way, it is able to further reduce the data transmission volume caused by the target optimization parameter.

Whether or not the target optimization parameter is to be updated may depend on various conditions, e.g., when an update period is expired, or when a transmission scenario has been changed, or when a stream selected by the receiver has been changed.

The above description is given by taking the encoder as an example. The method for processing the adaptive media service will be further described hereinafter from the aspect of a decoder.

Figure 8:
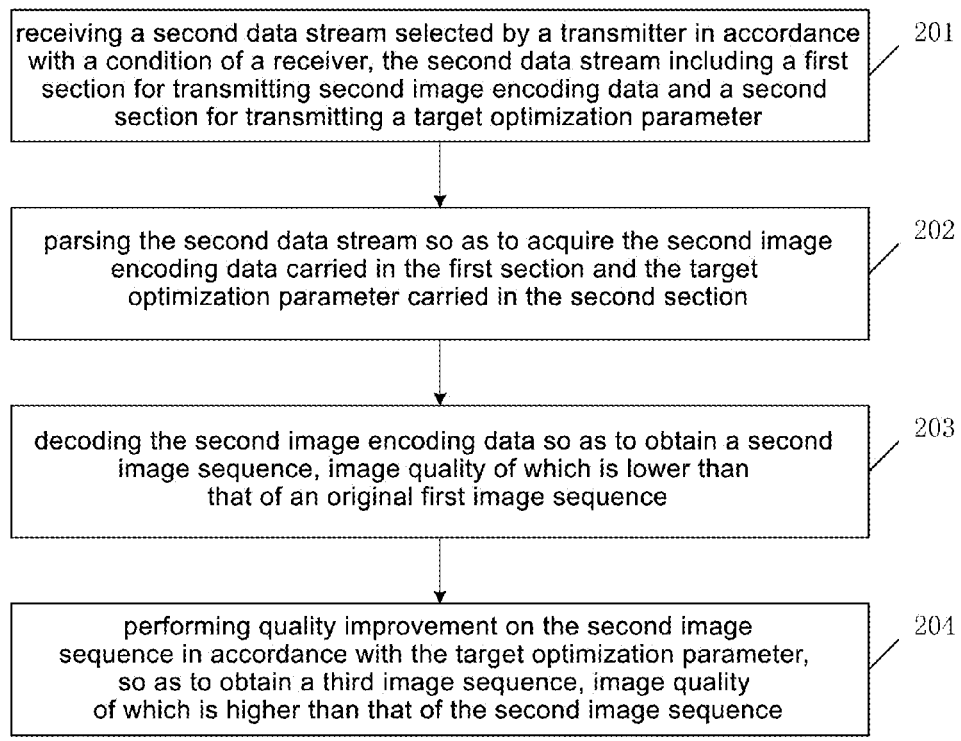
FIG. 8 is a flow chart of a method for processing an adaptive media service at a decoder according to one embodiment of the present disclosure.

As shown in FIG. 8, the present disclosure further provides in some embodiments a method for processing an adaptive media service at a decoder, which may include: a reception step 201 of receiving a second data stream selected by a transmitter in accordance with a condition of a receiver, the second data stream including a first section for transmitting second image encoding data and a second section for transmitting a target optimization parameter; a parsing step 202 of parsing the second data stream so as to acquire the second image encoding data carried in the first section and the target optimization parameter carried in the second section; a decoding step 203 of decoding the second image encoding data so as to obtain a second image sequence, image quality of which is lower than that of an original first image sequence; and a quality improvement step 204 of performing quality improvement on the second image sequence in accordance with the target optimization parameter, so as to obtain a third image sequence, image quality of which is higher than that of the second image sequence.

The target optimization parameter may be transmitted by the transmitter only in the case that the receiver is capable of parsing the target optimization parameter and performing the quality improvement in accordance with the target optimization parameter, so as to improve the utilization rate of the network bandwidth. At this time, the method may further include a second transmission step of transmitting the condition of the receiver to the transmitter.

In the embodiments of the present disclosure, the target optimization parameter may be determined as follows. The target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the available optimization parameter in_param.

In other words, the target optimization parameter may be determined in accordance with such a condition that a first similarity is greater than any second similarity. The first similarity is that between the third image sequence and the first image sequence, and the second similarity is that between an image sequence obtained through quality improvement on the second image sequence in accordance with the other optimization parameter in the available optimization parameters different from the target optimization parameter and the first image sequence.

The determination of the target optimization parameter has been described hereinabove, and thus will not be particularly defined herein.

In order to enable the transmitter to transmit the target optimization parameter only in the case that the receiver is capable of parsing the target optimization parameter and performing the quality improvement in accordance with the target optimization parameter, thereby to improve the utilization rate of the network bandwidth, the method may further include a third transmission step of transmitting to the transmitter a message indicating that the receiver is capable of parsing the target optimization parameter and performing the quality improvement in accordance with the target optimization parameter, so as to enable the transmitter to generate the second data stream and perform adaptive selection from a set including the second data stream.

In the embodiments of the present disclosure, a network condition and any other playing condition of the receiver may be changed gradually, and the streams shall not be switched frequently. Hence, the target optimization parameter may also be transmitted periodically or merely in the case that it has been changed, so as to reduce the data transmission volume. At this time, it is required to store a historical target optimization parameter at the receiver, and update it in real time. In the case of no new target optimization parameter, the stored historical target optimization parameter may be used for the subsequent quality improvement.

In other words, the method may further include: a storage step of storing the parsed target optimization parameter; and an extraction step of extracting, prior to receiving a new target optimization parameter, the stored target optimization parameter for the quality improvement step.

Of course, in order to reduce the data transmission volume caused by the target optimization parameter, in the embodiments of the present disclosure, the target optimization parameter carried in the second section is a compressed target optimization parameter, and the target optimization parameter is acquired in the parsing step through decompression.

Figure 9:
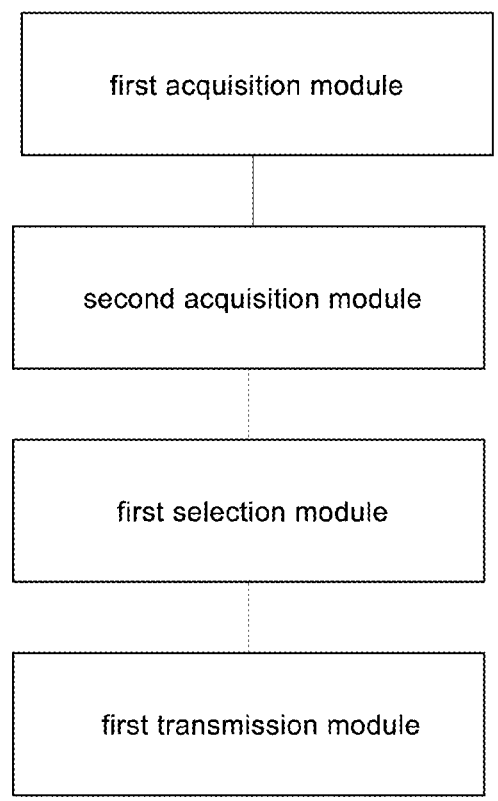
FIG. 9 is a schematic view showing a device for processing an adaptive media service at an encoder according to one embodiment of the present disclosure.

As shown in FIG. 9, the present disclosure further provides in some embodiments a device for processing an adaptive media service at an encoder, which may include: a first acquisition module configured to acquire a first data stream including first image encoding data obtained by encoding a first image sequence, so as to enable a receiver to acquire the first image sequence in accordance with the first image encoding data; a second acquisition module configured to acquire at least one second data stream, different second data streams having different image quality and each second data steam including second image encoding data obtained by encoding a second image sequence and a target optimization parameter corresponding to the second image encoding data, so as to enable the receiver to decode the second image encoding data to obtain the second image sequence, and perform quality improvement on the second image sequence in accordance with the target optimization parameter to obtain a third image sequence, the target optimization parameter being obtained in accordance with the first image sequence and the second image sequence, an identical content being recorded in the first image sequence, the second image sequence and the third image sequence, image quality of each second image sequence being lower than those of the first image sequence and the third image sequence; a first selection module configured to select one data stream from a first data stream set in accordance with a condition of the receiver, the first data stream set at least including the first data stream and the at least one second data stream; and a first transmission module configured to transmit the selected data stream to the receiver.

In one possible embodiment, the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the available optimization parameter in_param.

In other words, the target optimization parameter may be determined in accordance with such a condition that a first similarity is greater than any second similarity. The first similarity is that between the third image sequence and the first image sequence, and the second similarity is that between an image sequence obtained through quality improvement on the second image sequence in accordance with the other optimization parameter in the available optimization parameters different from the target optimization parameter and the first image sequence.

In one possible embodiment, the second acquisition module includes: a quality reduction module configured to perform quality reduction on the first image sequence so as to obtain the at least one second image sequence; an encoding module configured to encode each of second image sequences so as to obtain the second image encoding data corresponding to each of the second image sequences in a one-to-one manner; a first parameter determination module configured to calculate the target optimization parameter corresponding to each of the second image sequences in a one-to-one manner; and a combination module configured to combine the second image encoding data and the corresponding target optimization parameter so as to obtain the at least one second data stream.

In one possible embodiment, the second acquisition module includes: a quality reduction module configured to perform quality reduction on the first image sequence so as to obtain the at least one second image sequence; an encoding module configured to encode each of second image sequences so as to obtain the second image encoding data corresponding to each of the second image sequences in a one-to-one manner; a second parameter determination module configured to determine an image type of the first image sequence and a quality-reduction level corresponding to each second image sequence; a third parameter determination module configured to determine the target optimization parameter corresponding to each of the second image sequences in accordance with a pre-stored correspondence among the quality-reduction level, the image type and the target optimization parameter; and a combination module configured to combine each of the second image encoding data and the corresponding target optimization parameter so as to obtain the at least one second data stream.

In one possible embodiment, the second acquisition module includes: a quality reduction module configured to perform quality reduction on the first image sequence so as to obtain the at least one second image sequence; an encoding module configured to encode each of second image sequences so as to obtain the second image encoding data corresponding to each of the second image sequences in a one-to-one manner; a first determination module configured to determine a service type of the adaptive media service; a fourth parameter determination module configured to, in the case that the service type of the adaptive media service is a real-time service, acquire the target optimization parameter corresponding to each of the second image sequences in accordance with a pre-stored correspondence among a quality-reduction level, an image type and the target optimization parameter, and otherwise, calculate the target optimization parameter corresponding to each of the second image sequences; and a combination module configured to combine each of the second image encoding data and the corresponding target optimization parameter, so as to obtain the at least one second data stream.

In one possible embodiment, the device further includes a compression module configured to compress the target optimization parameter corresponding to each of the second image sequences, and the combination module is further configured to combine the second image encoding data and the corresponding compressed target optimization parameter.

In one possible embodiment, the second data stream includes a meta data section and an attachment support section, and the target optimization parameter is stored in the meta data section or the attachment support section.

In one possible embodiment, the device further includes: a third acquisition module configured to acquire at least one third data stream corresponding to the at least one second data stream, each third data stream including the corresponding second image encoding data rather than the target optimization parameter; and a first switching module configured to, in the case that a data volume of the target optimization parameter is greater than a predetermined threshold, trigger the first selection module and otherwise trigger the second selection module. The second selection module is further configured to select one data stream from a second data stream set, and the second data stream set consists of the first data stream and the at least one second data stream. The first data stream set consists of the first data stream, the at least one second data stream and the at least one third data stream.

In one possible embodiment, the device further includes a third acquisition module configured to acquire at least one third data stream corresponding to the at least one second data stream, each third data stream including the corresponding second image encoding data rather than the target optimization parameter. The first data stream set further includes the at least one third data stream.

In one possible embodiment, the device further includes: a third acquisition module configured to acquire at least one third data stream corresponding to the at least one second data stream, each third data stream including the corresponding second image encoding data rather than the target optimization parameter; and a second switching module configured to, in the case that the receiver is capable of parsing the target optimization parameter and performing the quality improvement in accordance with the target optimization parameter, trigger the first selection module, and otherwise trigger a third selection module which is configured to select one data stream from a third data stream set consisting of the first data stream and the at least one third data stream. The first data stream set consists of the first data stream and the at least one second data stream.

Figure 10:
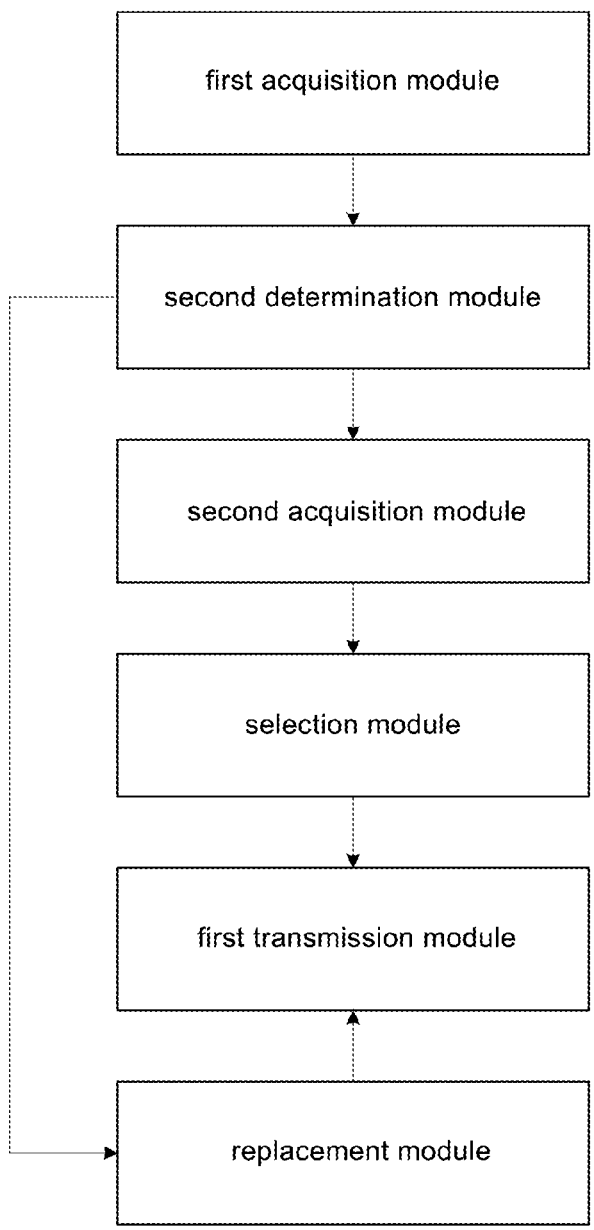
FIG. 10 is another schematic view showing the device for processing an adaptive media service at an encoder according to one embodiment of the present disclosure.

As shown in FIG. 10, the device further includes: a second determination module configured to determine, prior to acquiring the at least one second data stream, whether or not the target optimization parameter needs to be updated, so as to acquire a determination result, trigger the second acquisition module in the case that the determination result indicates that the target optimization parameter needs to be updated, and otherwise trigger a replacement module. The replacement module is configured to acquire at least one third data stream corresponding to the at least one second data stream, select one data stream from a third data stream set, and trigger the first transmission module. Each third data stream includes the corresponding second image encoding data rather than the target optimization parameter. The third data stream set consists of the first data stream and the at least one third data stream.

Figure 11:
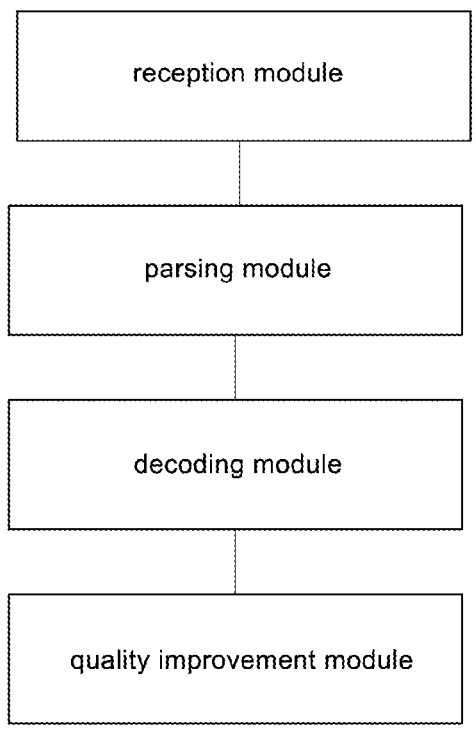
FIG. 11 is a schematic view showing a device for processing an adaptive media service at a decoder according to one embodiment of the present disclosure.

As shown in FIG. 11, the present disclosure provides in some embodiments a device for processing an adaptive media service at a decoder, which includes: a reception module configured to receive a second data stream selected by a transmitter in accordance with a condition of a receiver, the second data stream including a first section for transmitting second image encoding data and a second section for transmitting a target optimization parameter; a parsing module configured to parse the second data stream so as to acquire the second image encoding data carried in the first section and the target optimization parameter carried in the second section; a decoding module configured to decode the second image encoding data so as to obtain a second image sequence, image quality of which is lower than that of an original first image sequence; and a quality improvement module configured to perform quality improvement on the second image sequence in accordance with the target optimization parameter, so as to obtain a third image sequence, image quality of which is higher than that of the second image sequence.

In one possible embodiment, the device further includes a second transmission module configured to transmit the condition of the receiver to the transmitter.

In one possible embodiment, the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the available optimization parameter in_param.

In other words, the target optimization parameter may be determined in accordance with such a condition that a first similarity is greater than any second similarity. The first similarity is that between the third image sequence and the first image sequence, and the second similarity is that between an image sequence obtained through quality improvement on the second image sequence in accordance with the other optimization parameter in the available optimization parameters different from the target optimization parameter and the first image sequence.

In one possible embodiment, the device further includes a third transmission module configured to transmit to the transmitter a message indicating that the receiver is capable of parsing the target optimization parameter and performing the quality improvement in accordance with the target optimization parameter, so as to enable the transmitter to generate the second data stream and perform adaptive selection from a set including the second data stream.

In one possible embodiment, the device further includes: a storage module configured to store the parsed target optimization parameter; and an extraction module configured to extract, prior to receiving a new target optimization parameter, the stored target optimization parameter for the quality improvement module.

Of course, in order to reduce the data transmission volume caused by the target optimization parameter, in the embodiments of the present disclosure, the target optimization parameter carried in the second section is a compressed target optimization parameter, and the target optimization parameter is acquired by the parsing module through decompression.

The present disclosure further provides in some embodiments an encoder including the above-mentioned device for processing an adaptive media service at an encoder.

The present disclosure further provides in some embodiments a decoder including the above-mentioned device for processing an adaptive media service at a decoder.

A service system will be described hereinafter by taking the off-line service and the real-time service as examples.

Figure 12:
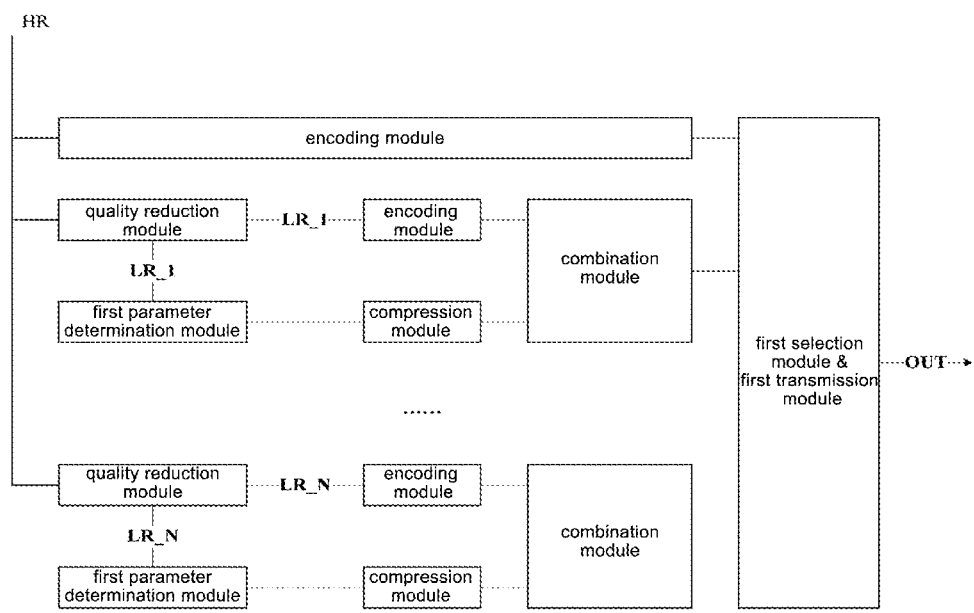
FIG. 12 is a schematic view showing a service system for an off-line service at an encoder according to one embodiment of the present disclosure.

As shown in FIG. 12, which is a schematic view showing a service system for the off-line service at the encoder according to one embodiment of the present disclosure, an image sequence (including one or more images) is inputted to an encoding module, and a bit stream having a data volume smaller than or equal to that of the image sequence is outputted from the encoding module.

An operation procedure at the encoder will be described as follows in conjunction with FIG. 12.

A plurality of compressed bit streams (N+1 bit streams in FIG. 12) may be inputted to the first selection and transmission modules. Then, the first selection and transmission modules may select and transmit one of the N+1 bit streams in accordance with a network condition and/or a playback condition of a user terminal.

A first bit stream inputted to the first selection and transmission modules may be obtained by compressing an original image sequence HR through the encoder, and the other N bit streams may be obtained by performing the other additional processing (e.g., resolution reduction) on the image sequence HR.

A processing procedure for each bit stream will be described as follows.

At first, the quality reduction (e.g., the resolution reduction) may be performed on the image sequence HR by the quality reduction module using such algorithms as High Efficiency Video Coding (HEVC), Automatic Volume Control (AVC), Motion Picture Experts Group-2 (MPEG-2) or Joint Photographic Experts Group (JPEG) 2000, so as to acquire an image sequence LR_m.

For the image sequence LR_m, the number of pixels and/or the number of bits for each pixel are smaller than those of the image sequence HR. For example, the image sequence HR may include a red-green-blue (RGB) image having a resolution of 1920*1080, with 24 bits for each pixel, while the image sequence LR_m may include an image having a resolution of 960*540, with 8 bits for each pixel.

Next, the image sequence LR_m may be compressed via the encoding module, so as to acquire an original bit stream. For example, a 7500 YUV 4:2:0 image having a resolution of 1920*1080 may be encoded by the encoding module into a 2 Mbps HEVC stream.

Next, a target optimization parameter corresponding to the image sequence LR_m may be calculated by the first parameter determination module using the above-mentioned methods.

Then, the target optimization parameter corresponding to the image sequence LR_m may be compressed by the compression module. For example, a 1024-bit target optimization parameter that meets an Institute of Electrical and Electronic Engineers (IEEE) Standard for Floating Point Arithmetic may be compressed into a 5 KB bit stream using an LZ77 algorithm and Huffman code.

Finally, the original bit stream and the compressed target optimization parameter may be combined by the combination module, so as to acquire the bit stream to be inputted to the first selection and transmission modules.

For example, an MPEG-TS stream including 2 Mbps HEVC video stream and a 64 kbps AAC audio stream may be inputted to the encoding module, and the target optimization parameter may also be compressed into a bit stream. The two bit streams may then be combined into a final bit stream.

The first selection and transmission modules may receive from the receiver the network condition and/or the playback condition, switch between different bit streams in an ascending order of the bit rates, and select the bit stream suitable for the receiver.

In different cases, these bit streams may be grouped into the following sets: a data stream set A consisting of the first data stream, the at least one second data stream and the at least one third data stream, a data stream set B consisting of the first data stream and the at least one second data stream, and a data stream set C consisting of the first data stream and the at least one third data stream.

For example, the data stream set A may include a data stream (20 Mbps) having a resolution of 4K, transmitted at a speed of 30 fps (frames per second) and encoded using an HEVC algorithm, a data stream (10 Mbps) having a resolution of 1080P, transmitted at a speed of 30 fps, encoded using the HEVC algorithm and carrying an image sequence Param_1 (500 KB), a data stream (10 Mbps) having a resolution of 1080P, transmitted at a speed of 30 fps, encoded using the HEVC algorithm and not carrying the image sequence Param_1, a data stream (5 Mbps) having a resolution of 720P, transmitted at a speed of 25 fps, encoded using the HEVC algorithm and carrying an image sequence Param_2 (200 KB), a data stream (5 Mbps) having a resolution of 720P, transmitted at a speed of 25 fps, encoded using the HEVC algorithm and not carrying the image sequence Param_2, a data stream (1 Mbps) having a resolution of 576P, transmitted at a speed of 25 fps, encoded using the HEVC algorithm and carrying an image sequence Param_3 (100 KB), and a data stream (1 Mbps) having a resolution of 576P, transmitted at a speed of 25 fps, encoded using the HEVC algorithm and not carrying the image sequence Param_3.

Figure 13:
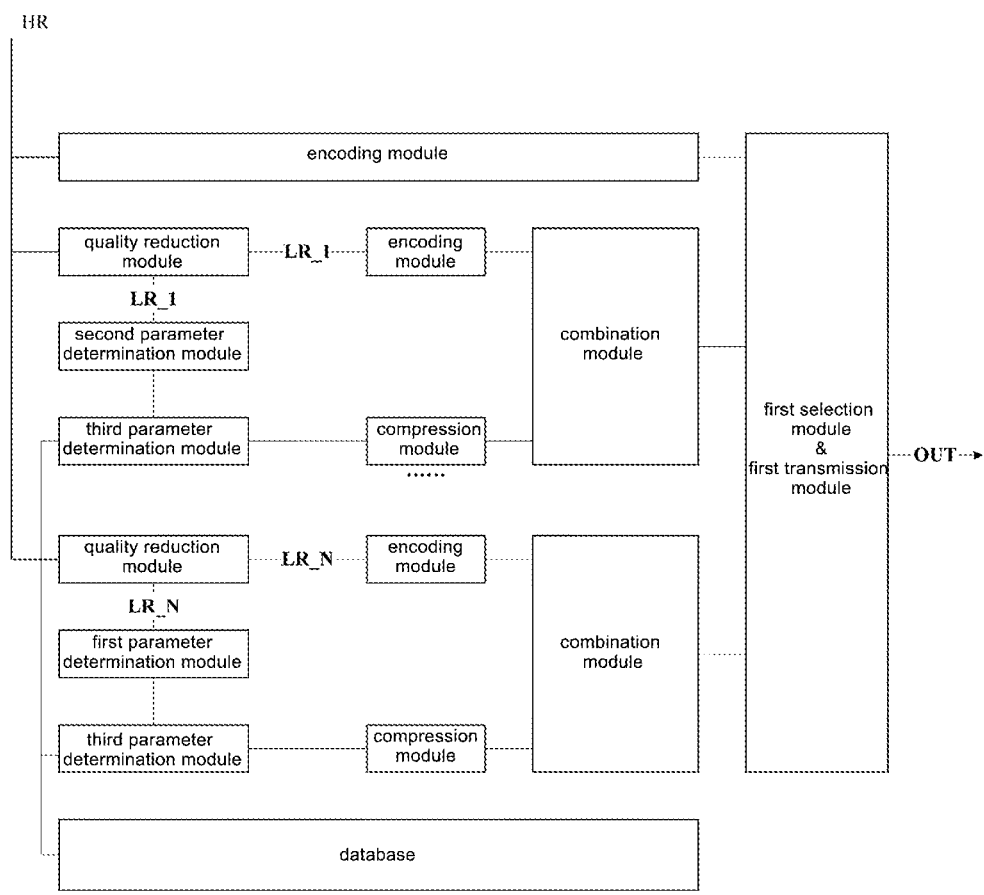
FIG. 13 is a schematic view showing the service system for a real-time service at an encoder according to one embodiment of the present disclosure.

FIG. 13 is a schematic view showing a service system for the real-time service at the encoder according to one embodiment of the present disclosure. The service system in FIG. 13 differs from that in FIG. 12 mainly in that the target optimization parameter is acquired in different modes.

The second parameter determination module needs to determine the image types and the resolutions of the image sequences HR and LR_m, while the third parameter determination module may call the correspondence recorded in the data base, so as to determine the target optimization parameter uniquely corresponding to the image type and the resolutions of the image sequences HR and LR_m.

An image having a resolution of 1920*1080 may, for example, be recorded as an array of integers, i.e., [1080, 1920].

In the embodiments of the present disclosure, each combination including an image type and a resolution of the image obtained after the quality reduction may be assigned with a unique identity (ID), and the target optimization parameter corresponding to each ID may be stored in the database.

Hence, after the image type and the resolution of the image obtained after the quality reduction have been determined, it is able to acquire the ID, and then acquire the corresponding target optimization parameter in accordance with the ID.

Figure 14:
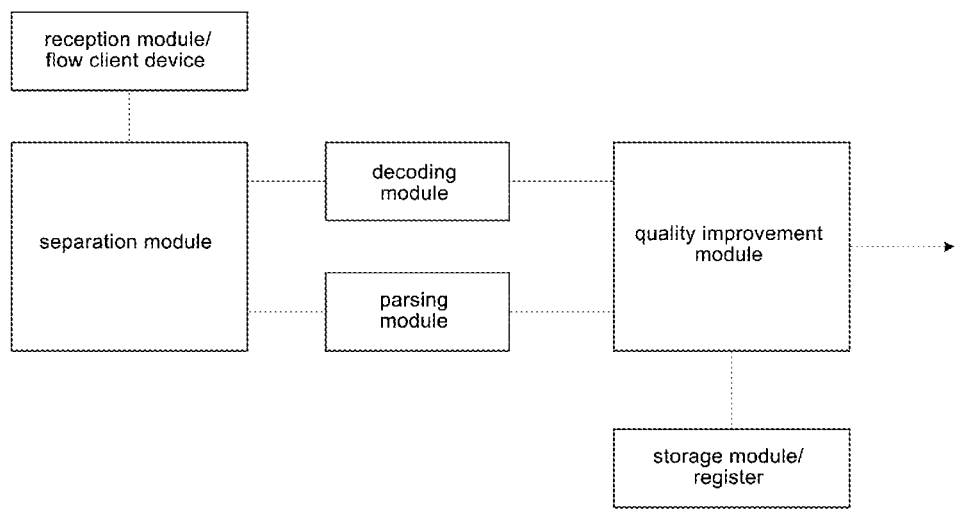
FIG. 14 is a schematic view showing a service system at a decoder according to one embodiment of the present disclosure.

As shown in FIG. 14, the present disclosure further provides in some embodiments a service system at a decoder, which includes the following modules.

The reception module, also called as a flow client device, may be used to achieve the following two functions, i.e., a reception function for receiving the compressed bit stream from an opposite end (the transmitter), and a feedback function for collecting the network condition and/or playback condition of a local end, and transmitting them to a server so as to enable the server to select a suitable bit stream in accordance with them.

In a conventional design, the reception module may be configured to: parse a manifest file or a file head so as to determine an available media file and bit rate information; set and manage at least one source cache; request and download a content fragment to the source cache; process a media event; and etc.

The functions of the reception module are known in the art, and thus will not be particularly defined herein.

Of course, in order to enable the opposite end to prepare for the data stream specifically, in the embodiments of the present disclosure, the feedback function may also include transmitting to the server information about whether or not the local end is capable of parsing and using the target optimization parameter to perform the quality improvement, and any other relevant information (e.g., information about a current version).

The reception module may be, for example, a conventional MPEG-DASH client device.

After the reception module has received the data stream, the data stream may be separated by a separation module into the first section carrying the second image encoding data and the second section carrying the target optimization parameter, and then the two sections may be transmitted to the decoding module and the parsing module for the subsequent processings.

The decoding module corresponds to the encoding module, and the parsing module corresponds to the compression module, and thus they will not be particularly defined herein.

In the case that the parsing module has parsed the target optimization parameter, it is also required to update the original parameter in a register, so as to facilitate the subsequent use.

Finally, the quality improvement module may perform the quality improvement on the decoded image sequence in accordance with the obtained target optimization parameter.

Of course, in the case of no target optimization parameter in the current data stream, the quality improvement parameter may be performed in accordance with the target optimization parameter pre-stored in the register.

The functional members described in the specification are referred to as modules, so as to emphasize the independence of the implementation in a more particular manner.

According to the embodiments of the present disclosure, the modules may be implemented by software, so as to be executed by various processors. For example, an identified, executable code module may comprise one or more physical or logical blocks including computer instructions, and the module can be constructed as an image, a process or a function. Even so, the executable codes of the identified modules are unnecessary to be physically located together, but may comprise different instructions stored in different locations. When these instructions are logically combined together, they form the modules and achieve the prescribed purposes of the modules.

Actually, the executable code module may be a single instruction or a plurality of instructions, and can even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit comprises a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for processing an adaptive media service at an encoder, comprising:
    a first acquisition step of acquiring a first data stream including first image encoding data obtained by encoding a first image sequence, so as to enable a receiver to acquire the first image sequence in accordance with the first image encoding data, wherein the first image sequence is an original image sequence;
    a second acquisition step of acquiring at least one second data stream, different second data streams having different image quality and each second data steam including second image encoding data obtained by encoding a second image sequence and a target optimization parameter corresponding to the second image encoding data, so as to enable the receiver to decode the second image encoding data to obtain the second image sequence, and perform quality improvement on the second image sequence in accordance with the target optimization parameter to obtain a third image sequence, the target optimization parameter being obtained in accordance with the first image sequence and the second image sequence, an identical content being recorded in the first image sequence, the second image sequence, and the third image sequence, image quality of each second image sequence being lower than those of the first image sequence and the third image sequence;
    a first selection step of selecting one data stream from a first data stream set in accordance with a condition of the receiver, the first data stream set at least including the first data stream and the at least one second data stream; and
    a first transmission step of transmitting the selected data stream to the receiver;
    wherein the second acquisition step comprises:
        a quality reduction step of performing quality reduction on the first image sequence so as to obtain the at least one second image sequence;
        an encoding step of encoding each of second image sequences so as to obtain the second image encoding data corresponding to each of the second image sequences in a one-to-one manner;
        a second parameter determination step of determining an image type of the first image sequence and a quality-reduction level corresponding to each of the second image sequences in a one-to-one manner;
        a third parameter determination step of determining the target optimization parameter corresponding to each of the second image sequences in accordance with a pre-stored correspondence among the quality-reduction level, the image type, and the target optimization parameter; and
        a combining step of combining each of the second image encoding data and the corresponding target optimization parameter so as to obtain the at least one second data stream,
    wherein the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the selected optimization parameter in_param;
    wherein the method further comprises a compression step of compressing the target optimization parameter corresponding to each of the second image sequences, wherein the combining step further comprises combining the second image encoding data and the corresponding compressed target optimization parameter; and
    wherein the second data stream comprises a meta data section and an attachment support section, and the target optimization parameter is stored in the meta data section or the attachment support section.

2. The method according to claim 1, further comprising:
    a third acquisition step of acquiring at least one third data stream corresponding to the at least one second data stream, each third data stream including the corresponding second image encoding data rather than the target optimization parameter; and
    a first switching step of, in the case that a data volume of the target optimization parameter is greater than a predetermined threshold, entering the first selection step and otherwise entering a second selection step,
    wherein the second selection step comprises selecting one data stream from a second data stream set, the second data stream set consists of the first data stream and the at least one second data stream, and the first data stream set consists of the first data stream, the at least one second data stream and the at least one third data stream.

3. The method according to claim 1, further comprising a third acquisition step of acquiring at least one third data stream corresponding to the at least one second data stream, each third data stream including the corresponding second image encoding data rather than the target optimization parameter, wherein the first data stream set further comprises the at least one third data stream.

4. The method according to claim 1, further comprising:
    a third acquisition step of acquiring at least one third data stream corresponding to the at least one second data stream, each third data stream including the corresponding second image encoding data rather than the target optimization parameter; and
    a second switching step of, in the case that the receiver is capable of parsing the target optimization parameter and performing the quality improvement in accordance with the target optimization parameter, entering the first selection step, and otherwise entering a third selection step of selecting one data stream from a third data stream set consisting of the first data stream and the at least one third data stream,
    wherein the first data stream set consists of the first data stream and the at least one second data stream.

5. The method according to claim 1, further comprising a second determination step of determining, prior to acquiring the at least one second data stream, whether or not the target optimization parameter needs to be updated, so as to acquire a determination result, entering the second acquisition step in the case that the determination result indicates that the target optimization parameter needs to be updated, and otherwise entering a replacement step,
    wherein the replacement step comprises acquiring at least one third data stream corresponding to the at least one second data stream, selecting one data stream from a third data stream set, and entering the first transmission step;

each third data stream comprises the corresponding second image encoding data rather than the target optimization parameter; and the third data stream set consists of the first data stream and the at least one third data stream.

6. The method according to claim 1, wherein the image type of the first image sequence includes cartoon image type or natural landscape image type.

7. A method for processing an adaptive media service at an encoder, comprising:
a first acquisition step of acquiring a first data stream including first image encoding data obtained by encoding a first image sequence, so as to enable a receiver to acquire the first image sequence in accordance with the first image encoding data, wherein the first image sequence is an original image sequence;
a second acquisition step of acquiring at least one second data stream, different second data streams having different image quality and each second data steam including second image encoding data obtained by encoding a second image sequence and a target optimization parameter corresponding to the second image encoding data, so as to enable the receiver to decode the second image encoding data to obtain the second image sequence, and perform quality improvement on the second image sequence in accordance with the target optimization parameter to obtain a third image sequence, the target optimization parameter being obtained in accordance with the first image sequence and the second image sequence, an identical content being recorded in the first image sequence, the second image sequence, and the third image sequence, image quality of each second image sequence being lower than those of the first image sequence and the third image sequence;
a first selection step of selecting one data stream from a first data stream set in accordance with a condition of the receiver, the first data stream set at least including the first data stream and the at least one second data stream; and
a first transmission step of transmitting the selected data stream to the receiver;
wherein the second acquisition step comprises:
a quality reduction step of performing quality reduction on the first image sequence so as to obtain the at least one second image sequence;
an encoding step of encoding each of second image sequences so as to obtain the second image encoding data corresponding to each of the second image sequences in a one-to-one manner;
a first determination step of determining a service type of the adaptive media service;
a fourth parameter determination step of, in the case that the service type of the adaptive media service is a real-time service, acquiring the target optimization parameter corresponding to each of the second image sequences in accordance with a pre-stored correspondence among a quality-reduction level, an image type, and the target optimization parameter, and otherwise, calculating the target optimization parameter corresponding to each of the second image sequences; and
a combining step of combining each of the second image encoding data and the corresponding target optimization parameter, so as to obtain the at least one second data stream, wherein the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the selected optimization parameter in_param;
wherein the method further comprises a compression step of compressing the target optimization parameter corresponding to each of the second image sequences, wherein the combining step further comprises combining the second image encoding data and the corresponding compressed target optimization parameter; and
wherein the second data stream comprises a meta data section and an attachment support section, and the target optimization parameter is stored in the meta data section or the attachment support section.

8. The method according to claim 7, wherein the image type of the first image sequence includes cartoon image type or natural landscape image type.

9. A device for processing an adaptive media service at an encoder, comprising:
a first acquisition circuit configured to acquire a first data stream including first image encoding data obtained by encoding a first image sequence, so as to enable a receiver to acquire the first image sequence in accordance with the first image encoding data, wherein the first image sequence is an original image sequence;
a second acquisition circuit configured to acquire at least one second data stream, different second data streams having different image quality and each second data steam including second image encoding data obtained by encoding a second image sequence and a target optimization parameter corresponding to the second image encoding data, so as to enable the receiver to decode the second image encoding data to obtain the second image sequence, and perform quality improvement on the second image sequence in accordance with the target optimization parameter to obtain a third image sequence, the target optimization parameter being obtained in accordance with the first image sequence and the second image sequence, an identical content being recorded in the first image sequence, the second image sequence, and the third image sequence, image quality of each second image sequence being lower than those of the first image sequence and the third image sequence;
a first selection circuit configured to select one data stream from a first data stream set in accordance with a condition of the receiver, the first data stream set at least including the first data stream and the at least one second data stream; and
a first transmission circuit configured to transmit the selected data stream to the receiver;
wherein the second acquisition circuit is further configured to:
perform quality reduction on the first image sequence so as to obtain the at least one second image sequence;
encode each of second image sequences so as to obtain the second image encoding data corresponding to each of the second image sequences in a one-to-one manner;

determine an image type of the first image sequence and a quality-reduction level corresponding to each of the second image sequences in a one-to-one manner;

determine the target optimization parameter corresponding to each of the second image sequences in accordance with a pre-stored correspondence among the quality-reduction level, the image type, and the target optimization parameter; and combine each of the second image encoding data and the corresponding target optimization parameter so as to obtain the at least one second data stream, wherein the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the selected optimization parameter in_param;

wherein the device is further configured to compress the target optimization parameter corresponding to each of the second image sequences, wherein the device is further configured to combine the second image encoding data and the corresponding compressed target optimization parameter; and wherein the second data stream comprises a meta data section and an attachment support section, and the target optimization parameter is stored in the meta data section or the attachment support section.

10. The device according to claim 9, wherein the image type of the first image sequence includes cartoon image type or natural landscape image type.

11. An encoder, comprising the device according to claim 9.

12. A device for processing an adaptive media service at an encoder, comprising:

a first acquisition circuit configured to acquire a first data stream including first image encoding data obtained by encoding a first image sequence, so as to enable a receiver to acquire the first image sequence in accordance with the first image encoding data, wherein the first image sequence is an original image sequence;

a second acquisition circuit configured to acquire at least one second data stream, different second data streams having different image quality and each second data steam including second image encoding data obtained by encoding a second image sequence and a target optimization parameter corresponding to the second image encoding data, so as to enable the receiver to decode the second image encoding data to obtain the second image sequence, and perform quality improvement on the second image sequence in accordance with the target optimization parameter to obtain a third image sequence, the target optimization parameter being obtained in accordance with the first image sequence and the second image sequence, an identical content being recorded in the first image sequence, the second image sequence, and the third image sequence, image quality of each second image sequence being lower than those of the first image sequence and the third image sequence;

a first selection circuit configured to select one data stream from a first data stream set in accordance with a condition of the receiver, the first data stream set at least including the first data stream and the at least one second data stream; and a first transmission circuit configured to transmit the selected data stream to the receiver, wherein the second acquisition circuit is further configured to:

perform quality reduction on the first image sequence so as to obtain the at least one second image sequence;

encode each of second image sequences so as to obtain the second image encoding data corresponding to each of the second image sequences in a one-to-one manner;

determine a service type of the adaptive media service;

acquire, in the case that the service type of the adaptive media service is a real-time service, the target optimization parameter corresponding to each of the second image sequences in accordance with a pre-stored correspondence among a quality-reduction level, an image type, and the target optimization parameter, and otherwise, calculate the target optimization parameter corresponding to each of the second image sequences; and combine each of the second image encoding data and the corresponding target optimization parameter, so as to obtain the at least one second data stream, wherein the target optimization parameter is an optimization parameter selected from at least two available optimization parameters in_param so as to provide MLM(LR,in_param) and the first image sequence with a maximum similarity, where LR represents the second image sequence, and MLM(LR,in_param) represents an image sequence obtained through the quality improvement on the LR in accordance with the selected optimization parameter in_param;

wherein the device is further configured to compress the target optimization parameter corresponding to each of the second image sequences, wherein the device is further configured to combine the second image encoding data and the corresponding compressed target optimization parameter; and wherein the second data stream comprises a meta data section and an attachment support section, and the target optimization parameter is stored in the meta data section or the attachment support section.

13. The device according to claim 12, wherein the image type of the first image sequence includes cartoon image type or natural landscape image type.

14. An encoder, comprising the device according to claim 12.

* * * * *